(12) United States Patent
Sakashita

(10) Patent No.: US 10,348,237 B2
(45) Date of Patent: Jul. 9, 2019

(54) MOTOR DRIVING DEVICE

(71) Applicant: Hitachi Automotive Systems, Ltd., Hitachinaka-shi, Ibaraki (JP)

(72) Inventor: Tomio Sakashita, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/759,737

(22) PCT Filed: Feb. 3, 2017

(86) PCT No.: PCT/JP2017/003929
§ 371 (c)(1),
(2) Date: Mar. 13, 2018

(87) PCT Pub. No.: WO2017/150070
PCT Pub. Date: Sep. 8, 2017

(65) Prior Publication Data
US 2019/0052218 A1 Feb. 14, 2019

(30) Foreign Application Priority Data
Mar. 2, 2016 (JP) ................................ 2016-039719

(51) Int. Cl.
| | | |
|---|---|---|
| *H02P 29/028* | (2016.01) | |
| *H02P 25/22* | (2006.01) | |
| *H02P 7/28* | (2016.01) | |
| *H02P 29/032* | (2016.01) | |
| *B62D 5/04* | (2006.01) | |
| *H02P 7/282* | (2016.01) | |

(52) U.S. Cl.
CPC .......... *H02P 29/028* (2013.01); *B62D 5/0463* (2013.01); *H02P 7/28* (2013.01); *H02P 7/282* (2013.01); *H02P 25/22* (2013.01); *H02P 29/032* (2016.02)

(58) Field of Classification Search
CPC ........ H02P 25/22; H02P 27/06; H02P 29/032; H02P 29/028; H02P 7/28; H02P 7/282; B62D 5/0463; B62D 5/046
See application file for complete search history.

(56) References Cited

U.S. PATENT DOCUMENTS

| | | | |
|---|---|---|---|
| 8,981,691 B2* | 3/2015 | Arai | H02P 29/0241 318/400.22 |
| 2011/0074323 A1* | 3/2011 | Mukai | B62D 5/0463 318/400.21 |

(Continued)

FOREIGN PATENT DOCUMENTS

| | | |
|---|---|---|
| JP | 2013-215040 A | 10/2013 |
| JP | 2015-80991 A | 4/2015 |
| WO | WO 2011/118019 A1 | 9/2011 |

OTHER PUBLICATIONS

International Preliminary Report on Patentability (PCT/IB/326, PCT/IB/338 & PCT/IB/373) issued in PCT Application No. PCT/JP2017/003929 dated Sep. 13, 2018 (three pages).

(Continued)

*Primary Examiner* — Thai T Dinh
(74) *Attorney, Agent, or Firm* — Crowell & Moring LLP

(57) ABSTRACT

Disclosed is a motor driving device for driving a motor having coil sets that includes energization systems each including a drive circuit, the drive circuits being one-to-one connected to the coil sets; first semiconductor switches disposed in the energization systems in a one-to-one correspondence, each first semiconductor switch lying between a power supply and the corresponding one of the drive circuits; and a second semiconductor switch which connects the power supply and each of the first semiconductor switches in series. Each of the first semiconductor switches includes a parasitic diode of which a forward direction is from the corresponding drive circuit to the second semicon- (Continued)

ductor switch, and the second semiconductor switch includes a parasitic diode of which a forward direction is from the power supply to the first semiconductor switches.

10 Claims, 8 Drawing Sheets

(56) References Cited

U.S. PATENT DOCUMENTS

| | | | |
|---|---|---|---|
| 2011/0156629 A1* | 6/2011 | Satou | B62D 5/0484 |
| | | | 318/453 |
| 2013/0043812 A1 | 2/2013 | Kono | |
| 2013/0257328 A1 | 10/2013 | Arai et al. | |
| 2015/0109020 A1 | 4/2015 | Morino | |
| 2015/0188479 A1* | 7/2015 | Asai | H02P 9/48 |
| | | | 318/400.13 |
| 2016/0248350 A1* | 8/2016 | Suzuki | H02P 6/10 |

OTHER PUBLICATIONS

International Search Report (PCT/ISA/220 & PCT/ISA/210) issued in PCT Application No. PCT/JP2017/003929 dated Apr. 25, 2017 with English translation (five pages).

Japanese-language Written Opinion (PCT/ISA/237)) issued in PCT Application No. PCT/JP2017/003929 dated Apr. 25, 2017 with English translation (eight pages).

* cited by examiner

MOTOR DRIVING DEVICE

TECHNICAL FIELD

The present invention relates to a motor driving device for driving a motor.

BACKGROUND ART

A known conventional motor driving device for driving a motor having mutually independent coil sets includes a plurality of energization systems each including a drive circuit for driving the corresponding one of the coil sets.

For example, the motor driving device for use in an electric power steering apparatus disclosed in Patent Document 1 includes such energization systems and power supply relays for the energization systems in a one-to-one correspondence. Each power supply relay, which is disposed between the power supply battery and the corresponding drive circuit, has two series-connected semiconductor switches. When an abnormality occurs in any of the energization systems, fail-safe processing is performed so as to turn off the power supply relay for this abnormal energization system and cut off power supply to the drive circuit located downstream to the power supply relay.

In each of the power supply relays for the energization systems provided in the motor driving device as described above, the two semiconductor switches are connected such that the forward directions of their parasitic diodes are opposite to each other. This aims to prevent formation of a closed circuit and resultant generation of a short circuit current while the power supply relays are turned off, which is otherwise expected when the power supply battery is connected to the motor driving device with reverse polarity by accident.

REFERENCE DOCUMENT LIST

Patent Document

Patent Document 1: JP 2013-215040 A

SUMMARY OF THE INVENTION

Problem to Be Solved By the Invention

However, the above conventional technique has a problem of complicating the fail-safe processing as described below. Here, when the rotor of the motor is rotated by an external force or the like while an abnormality occurs in the energization system, a counter electromotive force is generated even in this abnormal energization system. In order to prevent or reduce further failures of the circuit elements in this abnormal energization system, the counter electromotive force should be absorbed to regeneratively feed the power supply battery. Thus, it is additionally necessary to turn on, in the power supply relay of this abnormal energization system, the semiconductor switch that has the parasitic diode of which a forward direction is from the power supply battery to the corresponding drive circuit.

Furthermore, the above conventional technique requires the power supply relay in each energization system to have two semiconductor switches. Accordingly, there is a demand for reducing the number of components in the power supply relay to reduce the required cost and footprint.

In view of the above problems, the present invention has been made to provide a motor driving device that includes power supply relays with a reduced number of components and that is capable of regeneratively absorbing a counter electromotive force without extra control on the power supply relay provided in each energization system.

Means for Solving the Problem

To this end, the motor driving device according to the present invention for driving a motor having a plurality of coil sets comprises: a plurality of energization systems each including a drive circuit, the plurality of drive circuits being one-to-one connected to the plurality of coil sets; a plurality of first semiconductor switches disposed in the plurality of energization systems in a one-to-one correspondence, each first semiconductor switch lying between a power supply and a corresponding one of the plurality of drive circuits; and a second semiconductor switch which connects the power supply and each of the plurality of first semiconductor switches in series. Each of the plurality of first semiconductor switches includes a parasitic diode that conducts a current from the corresponding drive circuit to the second semiconductor switch, and the second semiconductor switch includes a parasitic diode that conducts a current from the power supply to the first semiconductor switches.

Effects of the Invention

The motor driving device according to the present invention includes power supply relays with a reduced number of components and is capable of regeneratively absorbing a counter electromotive force without extra control on the power supply relay provided in each energization system.

MODES FOR CARRYING OUT THE INVENTION

Figure 1:
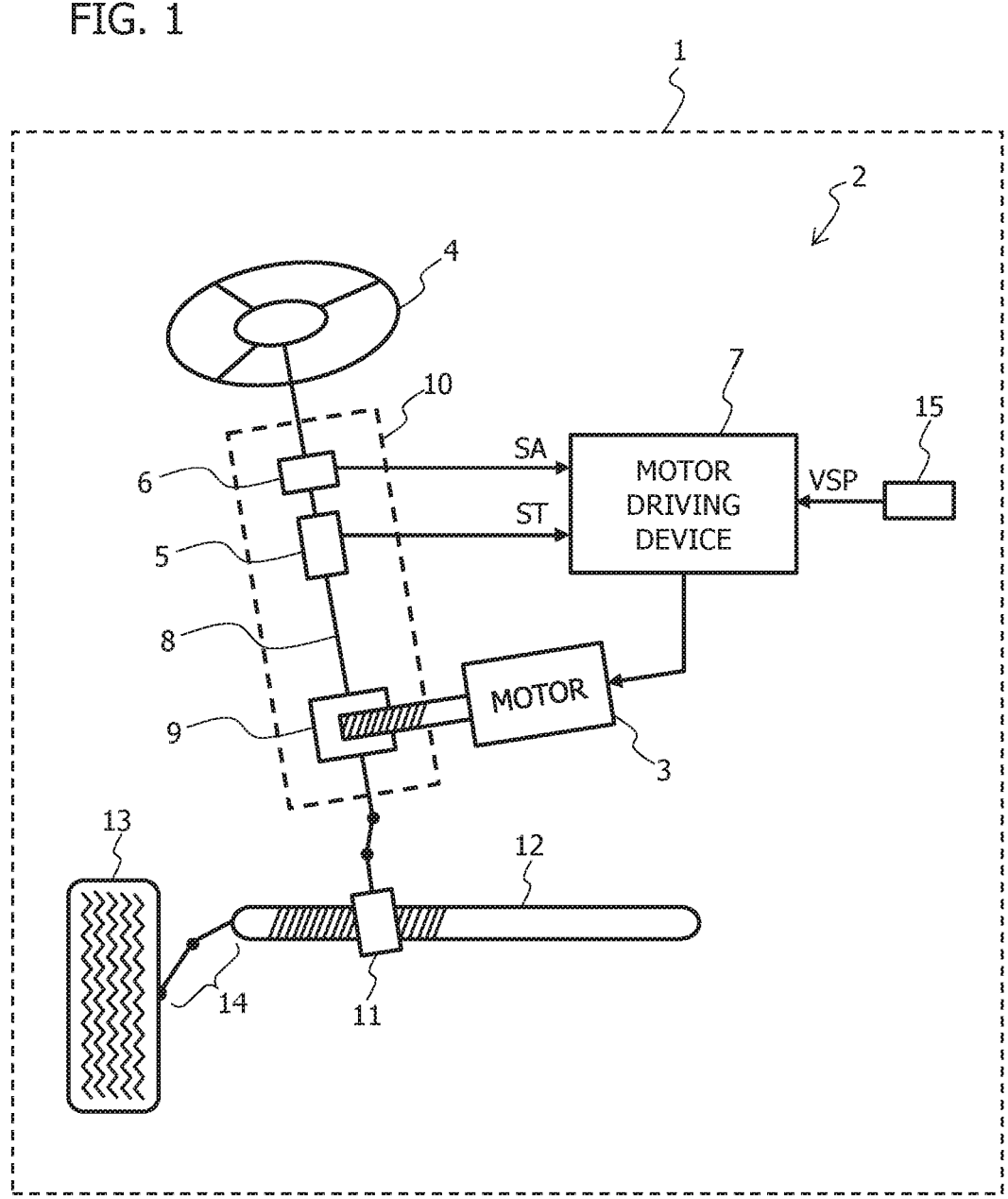
FIG. 1 is a schematic view illustrating an exemplary electric power steering system using the motor driving device according to a first embodiment of the present invention.

Embodiments of the present invention will be described below with reference to the accompanying drawings. FIG. 1 illustrates an exemplary electric power steering system using the motor driving device according to a first embodiment of the present invention.

An electric power steering system 2 for assisting the steering operation of the driver is installed in a vehicle 1, and includes a motor 3 which generates a steering assist force, a steering wheel 4 for handling, a steering torque sensor 5, a steering angle sensor 6, a motor driving device 7 for driving motor 3, and a reducer 9. Reducer 9 reduces the rotation of motor 3 and transmits the resultant rotation to a steering shaft 8 (pinion shaft). Steering torque sensor 5, steering angle sensor 6, and reducer 9 are provided in a steering column 10 which incorporates steering shaft 8.

A pinion gear 11 is provided to an end of steering shaft 8. When pinion gear 11 rotates, a rack gear 12 moves horizontally and sideways with respect to the travel direction of vehicle 1. To each of the opposite ends of rack gear 12, a steering mechanism 14 for a wheel 13 is provided. As rack gear 12 moves horizontally, wheels 13 change their orientation.

Steering torque sensor 5 senses a steering torque of steering shaft 8 generated when the driver of vehicle 1 performs steering operation, and outputs, to motor driving device 7, a measurement signal ST indicating the sensed steering torque. Steering angle sensor 6 senses, as a steering angle, the rotation angle of steering shaft 8 rotated when the driver of vehicle 1 performs steering operation to rotate steering wheel 4, and outputs a measurement signal SA indicating the sensed steering angle to motor driving device 7.

Based on the input signals such as the steering torque signal ST and the steering angle signal SA, a vehicle speed signal VSP output by a vehicle speed sensor 15, motor driving device 7 calculates the required steering assist force for assisting the steering operation of the driver. Motor driving device 7 then drives motor 3 in accordance with the steering assist force thus calculated.

Figure 2:
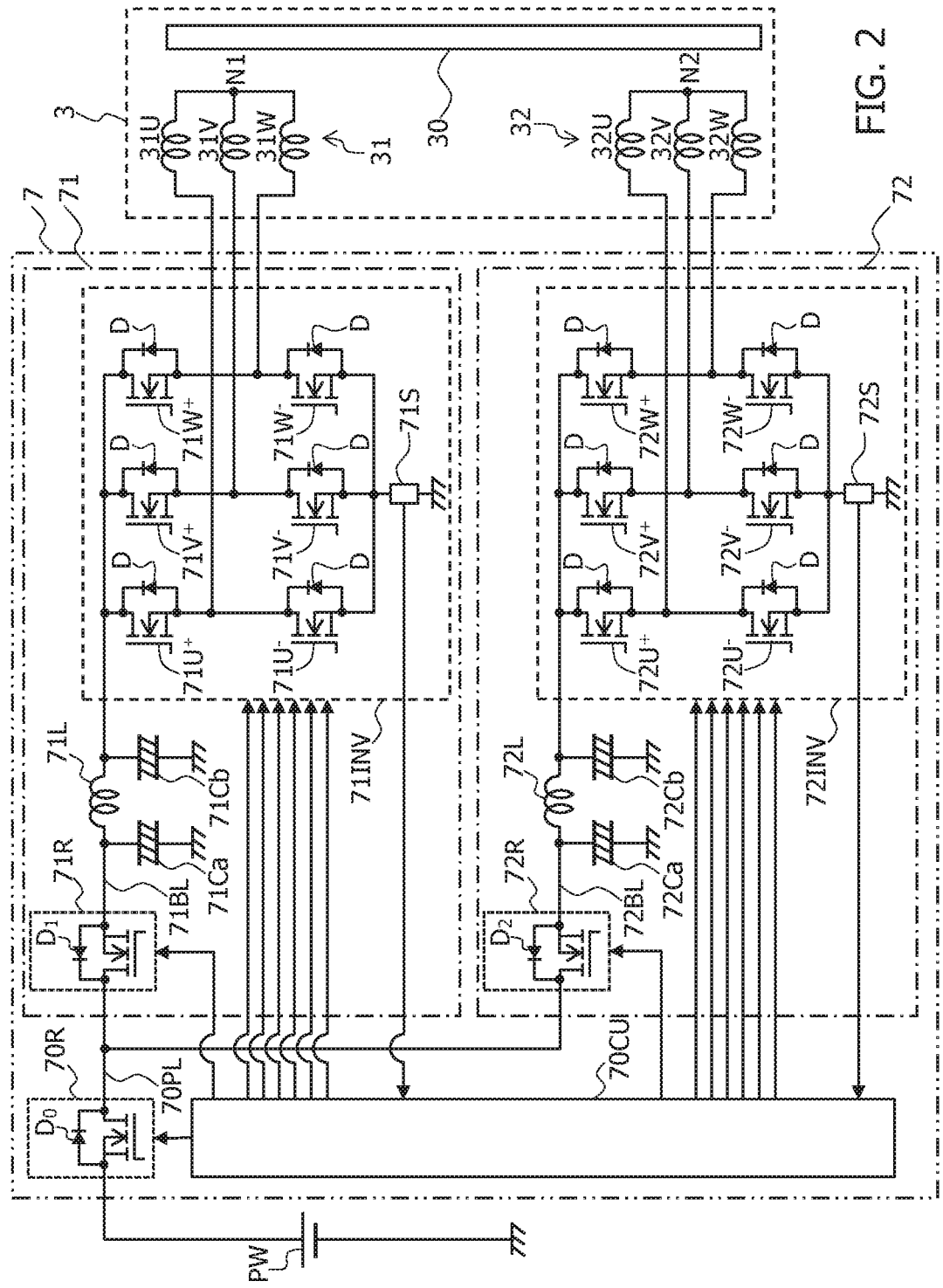
FIG. 2 is a circuit block diagram of the motor driving device.

FIG. 2 illustrates an exemplary internal configuration of motor 3 and motor driving device 7. Motor 3, which is a three-phase brushless motor, has a stator (not illustrated) and a rotor 30. The stator includes two mutually independent coil sets: a coil set 31 formed of three-phase coils, i.e., a U-phase coil 31U, a V-phase coil 31V, and a W-phase coil 31W; and a coil set 32 formed of three-phase coils, i.e., a U-phase coil 32U, a V-phase coil 32V, and a W-phase coil 32W. The rotor 30, which is a permanent magnet rotor, is rotatably disposed in a center portion of the stator. Coil sets 31, 32 are wound around the stator so as to be insulated from each other and share a magnetic circuit.

One ends of U-phase coil 31U, V-phase coil 31V, and W-phase coil 31W in coil set 31 are electrically connected to each other at a neutral point N1; in other words, U-phase coil 31U, V-phase coil 31V, and W-phase coil 31W are star-connected. One ends of U-phase coil 32U, V-phase coil 32V, and W-phase coil 32W in coil set 32 are electrically connected to each other at a neutral point N2; in other words, U-phase coil 32U, V-phase coil 32V, and W-phase coil 32W are star-connected. Note, however, that motor driving device 7 according to this embodiment may be used also for a motor including delta-connected three-phase coils.

Motor driving device 7 has two energization systems: an energization system 71 for supplying power to coil set 31 through a power feed line 71BL branched from a power supply line 70PL extending from the high-potential side of a direct current (DC) power supply PW; and an energization system 72 for supplying power to coil set 32 through a power feed line 72BL branched from power supply line 70PL. Energization system 71 includes a drive circuit 71INV for driving coil set 31, and drive circuit 71INV is connected to power feed line 71BL. Energization system 72 includes a drive circuit 72INV for driving coil set 32, and drive circuit 72INV is connected to power feed line 72BL.

Drive circuit 71INV has a three-phase bridge circuit including upper-arm switching elements $71U^+$, $71V^+$, $71W^+$ and lower-arm switching elements $71U^-$, $71V^-$, $71W^-$. Between power feed line 71BL and ground, upper-arm switching elements $71U^+$, $71V^+$, $71W^+$ are respectively series-connected to lower-arm switching elements $71U^-$, $71V^-$, $71W^-$, and these three series-connected switching element pairs are connected in parallel with each other.

Drive circuit 72INV has a three-phase bridge circuit including upper-arm switching elements $72U^+$, $72V^+$, $72W^+$ and lower-arm switching elements $72U^-$, $72V^-$, $72W^-$. Between power feed line 72BL and ground, upper-arm switching elements $72U^-$, $72V^+$, $72W^+$ are respectively series-connected to lower-arm switching elements $72U^-$, $72V^-$, $72W^-$, and these three series-connected switching element pairs are connected in parallel with each other.

In drive circuit 71INV, the end opposite to the one end connected at the neutral point N1 of U-phase coil 31U is connected to a point between switching element $71U^+$ and switching element $71U^-$. Similarly, the end opposite to the one end connected at the neutral point N1 of V-phase coil 31V is connected to a point between switching element $71V^-$ and switching element $71V^-$. Similarly, the end opposite to the one end connected at the neutral point N1 of W-phase coil 31W is connected to a point between switching element $71W^+$ and switching element $71W^-$.

In drive circuit 72INV, the end opposite to the one end connected at the neutral point N2 of U-phase coil 32U is connected to a point between switching element $72U^+$ and switching element $72U^-$. Similarly, the end opposite to the one end connected at the neutral point N2 of V-phase coil 32V is connected to a point between switching element $72V^-$ and switching element $72V^-$. Similarly, the end opposite to the one end connected at the neutral point N2 of W-phase coil 32W is connected to a point between switching element $72W^+$ and switching element $72W^-$.

Each switching element $71U^-$, $71U^-$, $71V^+$, $71V^-$, $71W^+$, $71W^-$, $72U^+$, $72U^-$, $72V^+$, $72V^-$, $72W^+$, $72W^-$ is a semiconductor element which is turned on and off by a control signal input to the control terminal of the switching element, and to which a diode D is connected in antiparallel for absorbing a counter electromotive force from motor 3 to regeneratively feed DC power supply PW. When each switching element $71U^+$, $71U^-$, $71V^+$, $71V^-$, $71W^+$, $71W^-$, $72U^+$, $72U^-$, $72V^+$, $72V^-$, $72W^+$, $72W^-$ is a semiconductor element having a parasitic diode that is inevitably formed in the manufacturing process, such as a metal-oxide-semiconductor field-effect transistor (MOSFET), the parasitic diode may substitute diode D.

As used herein, the "on" state of each switching element $71U^+$, $71U^-$, $71V^+$, $71V^-$, $71W^+$, $71W^-$, $72U^+$, $72U^-$, $72V^+$, $72V^-$, $72W^+$, $72W^-$ refers to the energized state in which an electric current flows through the switching element. On the other hand, the "off" state of each switching element $71U^+$, $71U^-$, $71V^+$, $71V^-$, $71W^+$, $71W^-$, $72U^+$, $72U^-$, $72V^+$, $72V^-$, $72W^+$, $72W^-$ refers to the cut-off state in which an electric current through the switching element is cut off. The same applies to each semiconductor switch, which will be described later.

Drive circuit 71INV includes a current sensor 71S that outputs a measurement signal of an electric current flowing from lower-arm switching elements $71U^-$, $71V^-$, $71W^-$ to ground, i.e., an electric current flowing through coil set 31. Current sensor 71S includes, for example, a shunt resistor and outputs, as the measurement signal of an electric current flowing through coil set 31, a voltage corresponding to the potential difference between the opposite ends of the shunt resistor.

Drive circuit 72INV includes a current sensor 72S that outputs a measurement signal of an electric current flowing from lower-arm switching elements 72U$^-$, 72V$^-$, 72W$^-$ to ground, i.e., an electric current flowing through coil set 32. Current sensor 72S includes, for example, a shunt resistor and outputs, as the measurement signal of an electric current flowing through coil set 32, a voltage corresponding to the potential difference between the opposite ends of the shunt resistor.

In energization system 71, power feed line 71BL is provided with (extending through) a π-type low pass filter including a coil 71L and two electrolytic capacitors 71Ca, 71Cb which individually connect the two ends of coil 71L to ground. In energization system 72, power feed line 72BL is provided with (extending through) a π-type low pass filter including a coil 72L and two electrolytic capacitors 72Ca, 72Cb which individually connect the two ends of coil 72L to ground. These low-pass filters attenuate and cut off a component having a frequency higher than a predetermined cut-off frequency in the power supply current flowing from DC power supply PW to drive circuits 71INV, 72INV.

Motor driving device 7 has a controller 70CU. Controller 70CU includes a calculation means such as a central processing unit (CPU) and a microprocessor, and a storage means such as read only memory (ROM) and random access memory (RAM). As described above, based on the various input signals, controller 70CU calculates the required steering assist force for assisting the steering operation of the driver, which is referred to as target steering assist force, and controls drive circuits 71INV, 72INV to drive motor 3 in accordance with the target steering assist force.

In the following description for this embodiment, controller 70CU performs various calculation processing operations by causing the calculation means to read and execute a program stored in advance in the storage means. However, the present invention is not limited to this. As an alternative, a hardware configuration may implement a part or all of each calculation processing operation.

During a normal state, i.e., when controller 70CU diagnoses by using an abnormality diagnostic function, which will be described later, that energization systems 71, 72 and the like operate normally, controller 70CU causes motor 3 to generate a torque corresponding to the target steering assist force by using the total output current obtained by adding the output currents of both driving circuits 71INV, 72INV together. The output current ratio between drive circuits 71INV, 72INV during the normal state, which is stored in advance in the storage means such as the ROM or the like, is set to 50% to 50%, for example.

Based on the target steering assist force, controller 70CU calculates the target total output current to flow through motor 3. For example, a data table including a previously defined correspondence relation between the target steering assist force values and the target total output current values may be stored in the ROM or the like. In this case, by referring to the data table, the target total output current value corresponding to the target steering assist force is selected. Based on the target total output current and the output current ratio between drive circuits 71INV, 72INV, controller 70CU calculates a first target output current for drive circuit 71INV and a second target output current for drive circuit 72INV.

Based on the measurement signal of current sensor 71S, controller 70CU calculates a first actual current actually flowing through coil set 31. Then, based on the difference between the first target output current and the first actual current, controller 70CU generates six control signals for individually turning on and off six switching elements 71U$^+$, 71U$^-$, 71V$^+$, 71V$^-$, 71W$^+$, 71W$^-$ of drive circuit 71INV by, for example, pulse width modulation (PWM) control. Controller 70CU outputs these six control signals individually to the control terminals of the switching elements, thereby controlling the torque of motor 3.

Based on the measurement signal of current sensor 72S, controller 70CU calculates a second actual current actually flowing through coil set 32. Then, based on the difference between the second target output current and the second actual current, controller 70CU generates six control signals for individually turning on and off six switching elements 72U$^+$, 72U$^-$, 72V$^+$, 72V$^-$, 72W$^+$, 72W$^-$ of drive circuit 72INV by, for example, PWM control. Controller 70CU outputs these six control signals individually to the control terminals of the switching elements, thereby controlling the torque of motor 3.

Here, controller 70CU not only controls the torque of motor 3 but also has a well-known abnormality diagnostic function for diagnosing whether or not an abnormality has occurred in energization system 71 and coil set 31 or energization system 72 and coil set 32. For example, by using the abnormality diagnostic function, controller 70CU diagnoses that an overcurrent occurs when the first actual current sensed by current sensor 71S or the second actual current sensed by current sensor 72S continues to flow for a predetermined time.

Motor driving device 7 includes semiconductor switches (first semiconductor switches) each serving as a power supply relay for the corresponding energization system. During an abnormal state, i.e., when controller 70CU diagnoses by using the abnormality diagnostic function that an abnormality has occurred in energization system 71 and coil set 31 or energization system 72 and coil set 32, controller 70CU cuts off power supply from DC power supply PW to the energization system in which the abnormality has occurred. Specifically, in energization system 71, power feed line 71BL is provided with (extending through) a semiconductor switch 71R. In energization system 72, power feed line 72BL is provided with (extending through) a semiconductor switch 72R. Semiconductor switches 71R, 72R are controlled by controller 70CU. Controller 70CU starts to control semiconductor switches 71R, 72R when a potential need for generating the steering assist force by using the torque generated by motor 3 arises, such as when the ignition key of vehicle 1 is turned on. Note that semiconductor switches 71R, 72R are turned off before the control is started.

Semiconductor switch 71R is a semiconductor element, such as a MOSFET, having a parasitic diode $D_1$ that is inevitably formed in the manufacturing process. Semiconductor switch 71R is turned on and off by a control signal input to its control terminal. Parasitic diode $D_1$ of semiconductor switch 71R conducts a current from drive circuit 71INV to DC power supply PW. Thereby, parasitic diode $D_1$ absorbs a counter electromotive force from motor 3 to regeneratively feed DC power supply PW even when semiconductor switch 71R is turned off. Accordingly, the forward direction of parasitic diode $D_1$ in semiconductor switch 71R is from drive circuit 71INV to DC power supply PW. For example, when semiconductor switch 71R is an N-channel type MOSFET, its source terminal is connected to drive circuit 71INV and its drain terminal is connected to DC power supply PW.

Like semiconductor switch 71R, semiconductor switch 72R is a semiconductor element, such as a MOSFET, having a parasitic diode $D_2$. Parasitic diode $D_2$ of semiconductor switch 72R conducts a current from drive circuit 72INV to DC power supply PW. Thereby, even when semiconductor switch 72R is turned off, parasitic diode $D_2$ absorbs a counter electromotive force from motor 3 to regeneratively feed DC power supply PW. Accordingly, the forward direction of parasitic diode $D_2$ in semiconductor switch 72R is from drive circuit 72INV to DC power supply PW. For example, when semiconductor switch 72R is an N-channel type MOSFET, its source terminal is connected to drive circuit 72INV and its drain terminal is connected to DC power supply PW.

When controller 70CU diagnoses by using the abnormality diagnostic function that, for example, an abnormality has occurred in energization system 71 and coil set 31, controller 70CU performs fail-safe processing to output the control signals for turning off semiconductor switch 71R as well as switching elements $71U^+$, $71U^-$, $71V^+$, $71V^-$, $71W^+$, $71W^-$ of drive circuit 71INV so as to cut off power supply to drive circuit 71INV and coil set 31. Controller 70CU controls the torque of motor 3 in the aforementioned manner so as to cause motor 3 to generate a torque corresponding to the target steering assist force by using drive circuit 72INV in energization system 72, which is diagnosed as operating normally. The output current ratio of drive circuit 72INV is set to a predetermined value of 50 to 100% so as to enable the driver's steering operation.

On the other hand, when controller 70CU diagnoses by using the abnormality diagnostic function that, for example, an abnormality has occurred in energization system 72 and coil set 32, controller 70CU performs the fail-safe processing to output the control signals for turning off semiconductor switch 72R as well as switching elements $72U^+$, $72U^-$, $72V^+$, $72V^-$, $72W^+$, $72W^-$ of drive circuit 72INV so as to cut off power supply to drive circuit 72INV and coil set 32. Controller 70CU controls the torque of motor 3 in the aforementioned manner so as to cause motor 3 to generate a torque corresponding to the target steering assist force by using drive circuit 71INV in energization system 71, which is diagnosed as operating normally. The output current ratio of drive circuit 71INV is set to the predetermined value of 50 to 100% so as to enable the driver's steering operation.

Figure 3:
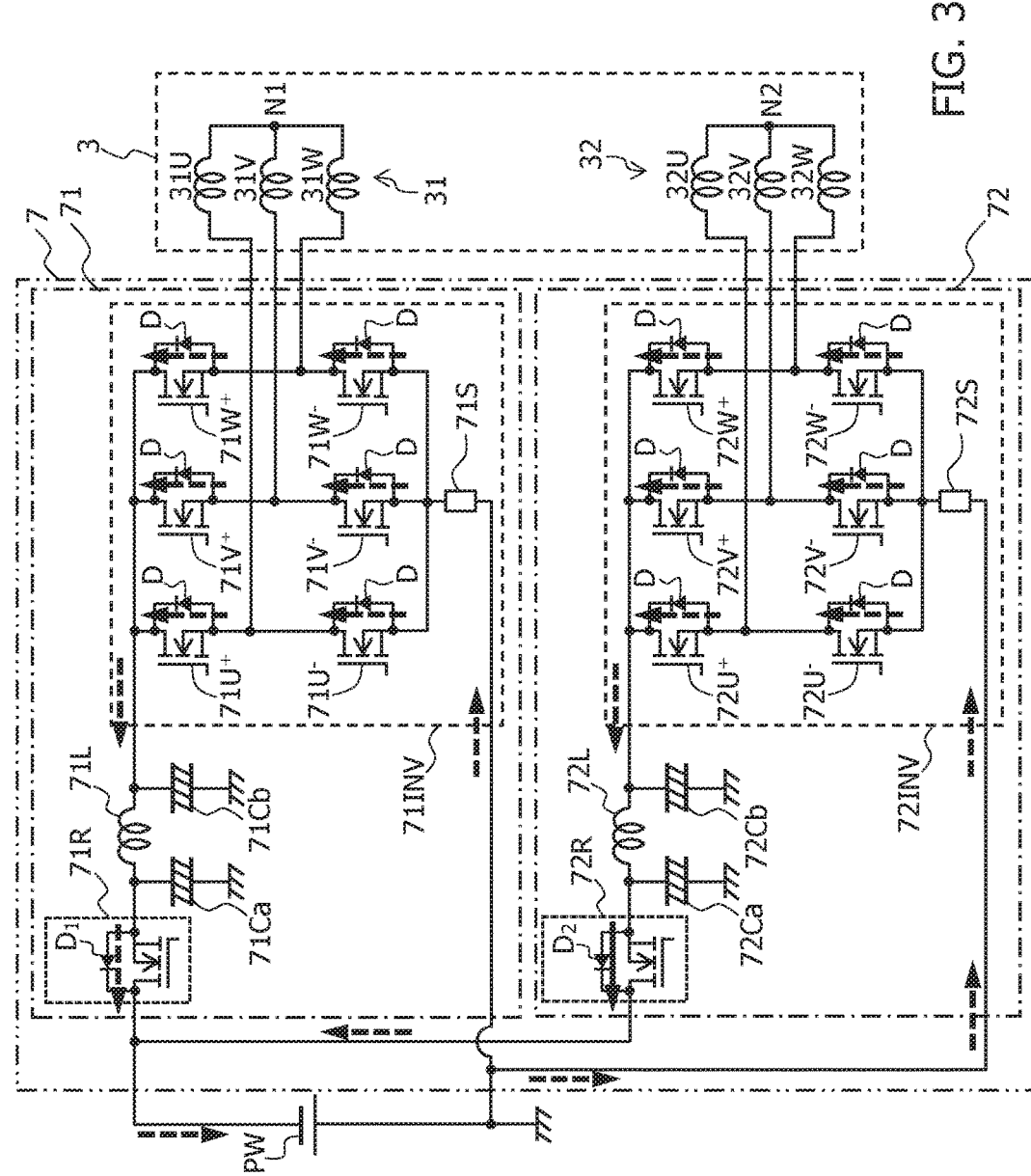
FIG. 3 is a circuit diagram of the motor driving device which lacks the second semiconductor switching element and to which the power supply is reversely connected.

Assume here that DC power supply PW is reversely connected to motor driving device 7, i.e., connected with reverse polarity by accident after, for example, battery replacement, as illustrated in FIG. 3. In such a case, only providing, as power supply relays, semiconductor switches 71R, 72R respectively to energization systems 71, 72 will permit a closed circuit to be formed, thus allowing the generation of an excessive short circuit current, even when semiconductor switches 71R, 72R as well as switching elements $71U^+$, $71U^-$, $71V^+$, $71V^-$, $71W^+$, $71W^-$, $72U^+$, $72U^-$, $72V^+$, $72V^-$, $72W^+$, $72W^-$ are all turned off.

In this case, electric currents flow as indicated by dashed arrows of FIG. 3. Specifically, in energization system 71, an electric current from the reversely connected DC power supply PW flows through ground and enters drive circuit 71INV. In drive circuit 71INV, the electric current flows sequentially through diodes D of each lower-arm switching element $71U^-$, $71V^-$, $71W^-$ and each upper-arm switching element $71U^+$, $71V^+$, $71W^+$. After that, the electric current flows through diode $D_1$ of semiconductor switch 71R back to DC power supply PW. In addition, in energization system 72, an electric current from the reversely connected DC power supply PW flows through ground and enters drive circuit 72INV. In drive circuit 72INV, the electric current flows sequentially through diodes D of each lower-arm switching element $72U^-$, $72V^-$, $72W^-$ and each upper-arm switching element $72U^+$, $72V^+$, $72W^+$. After that, the electric current flows through diode $D_2$ of semiconductor switch 72R back to DC power supply PW.

In consideration of such possible reverse connection of DC power supply PW, it may be conceivable to provide, as a power supply relay for each energization system, two semiconductor switches which are connected in series such that the forward directions of their parasitic diodes are opposite to each other, as disclosed in JP 2013-215040 A. Specifically, it may be conceivable to provide a semiconductor switch in addition to semiconductor switch 71R and connect these two semiconductor switches in series such that the forward directions of their parasitic diodes are opposite to each other, and provide a semiconductor switch in addition to semiconductor switch 72R and connect these two semiconductor switches in series such that the forward directions of their parasitic diodes are opposite to each other. However, adding semiconductor switches as described above not only doubles the number of components and increases the required cost and footprint, but also complicates the fail-safe processing. Specifically, after the fail-safe processing is performed to turn off these series-connected two semiconductor switches collectively serving as the power supply relay in one of the energization systems, it is additionally necessary to turn on the additional semiconductor switch again in order to absorb a counter electromotive force caused by the rotation of motor 3 to regeneratively feed DC power supply PW.

To avoid the above problems, as power supply relays, motor driving device 7 includes a single semiconductor switch 70R (second semiconductor switch) in addition to semiconductor switches 71R, 72R such that power supply line 70PL is provided with (extends through) semiconductor switch 70R. Semiconductor switch 70R connects each of semiconductor switches 71R, 72R and DC power supply PW in series. Like semiconductor switches 71R, 72R, semiconductor switch 70R is controlled by controller 70CU. Controller 70CU starts to control semiconductor switch 70R when a potential need for generating the steering assist force by using the torque generated by motor 3 arises, such as when the ignition key of vehicle 1 is turned on. Note that semiconductor switch 70R is turned off before the control is started.

Like semiconductor switches 71R, 72R, semiconductor switch 70R is a semiconductor element, such as a MOSFET, having a parasitic diode $D_0$ that is inevitably formed in the manufacturing process. Semiconductor switch 70R is turned on and off by a control signal from controller 70CU input to its control terminal.

To prevent closed circuit formation due to the reverse connection of DC power supply PW, semiconductor switch 70R is connected to power supply line 70PL such that parasitic diode $D_0$ conducts a current from DC power supply PW to semiconductor switches 71R, 72R. Accordingly, the forward direction of parasitic diode $D_0$ in semiconductor switch 70R is from DC power supply PW to semiconductor switches 71R, 72R. For example, when semiconductor switch 70R is an N-channel type MOSFET, its source terminal is connected to DC power supply PW and its drain terminal is connected to semiconductor switches 71R, 72R.

When DC power supply PW is reversely connected to motor driving device 7 after battery replacement, no proper voltage is supplied to controller 70CU, so that controller 70CU does not operate and thus semiconductor switch 70R is turned off. Accordingly, even when, as illustrated in FIG. 3, DC power supply PW is reversely connected by accident after, for example, battery replacement, semiconductor switch 70R, which is turned off, cuts off a short circuit current that flows through parasitic diodes $D_1$, $D_2$ of semiconductor switches 71R, 72R back toward DC power supply PW.

Next, referring to FIG. 4, the power regeneration effect through counter electromotive force absorption in motor driving device 7 will be described. Assume here that controller 70CU diagnoses that an abnormality has occurred in energization system 71 and coil set 31 and performs the fail-safe processing to turn off semiconductor switch 71R as well as switching elements $71U^+$, $71U^-$, $71V^+$, $71V^-$, $71W^+$, $71W^-$ of drive circuit 71INV. In addition, controller 70CU maintains semiconductor switches 70R, 72R turned on, and resets the output current ratio of drive circuit 72INV in energization system 72, which is diagnosed as operating normally, to the predetermined value of 50 to 100%. When driving motor 3, controller 70CU outputs, based on the output current ratio, the control signals for turning on and off switching elements $72U^-$, $72U^-$, $72V^+$, $72V^-$, $72W^+$, $72W^-$ so as to cause motor 3 to generate a torque corresponding to the target steering assist force.

Figure 4:
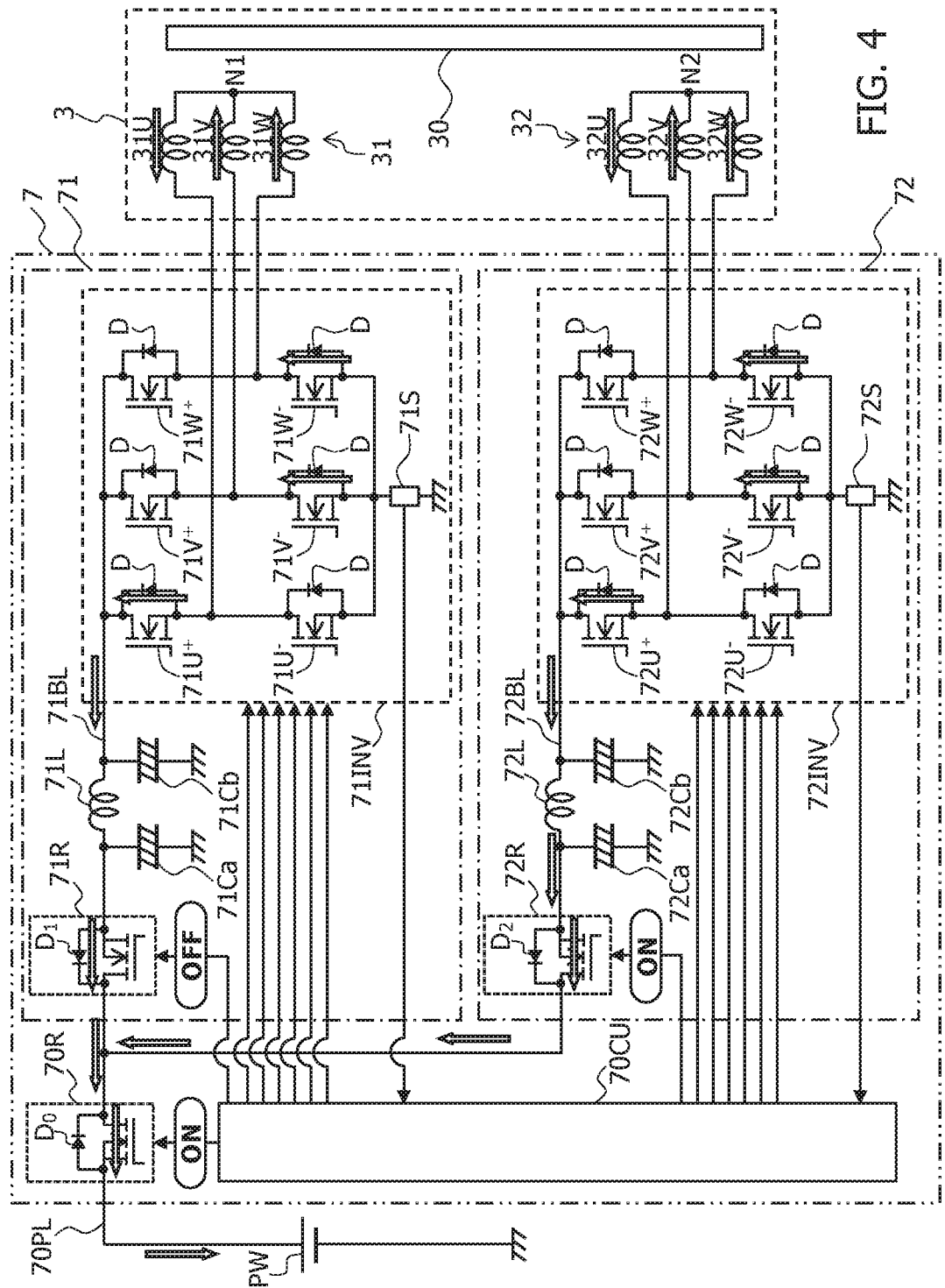
FIG. 4 is a circuit block diagram for illustrating power regeneration through counter electromotive force absorption in the motor driving device.

Assume further that, during such an operating state of motor driving device 7, rotor 30 of motor 3 rotates to a certain rotational position relative to the three-phase coils of coil sets 31, 32, and such rotation of rotor 30 generates a counter electromotive force that causes electric currents to flow through the three-phase coils of coil sets 31, 32 as indicated by blank arrows of in FIG. 4. Here, rotor 30 may be rotated, for example, by a change in orientation of wheels 13 caused by an external force, or by controller 70CU that is controlling the torque of motor 3 using energization system 72 and coil set 32, which are operating normally.

In such a case, in energization system 72 and coil set 32, which are diagnosed as operating normally, an electric current flows through diode D of each lower-arm switching element $72V^-$, $72W^-$ and enters V-phase coil 32V and W-phase coil 32W of coil set 32. Then, the electric current flows through the neutral point N2 and then U-phase coil 32U. After that, the electric current flows through diode D of upper-arm switching element $72U^+$ and reaches semiconductor switch 72R. Since both of semiconductor switches 72R, 70R are turned on, the electric current caused by the counter electromotive force flows through semiconductor switches 72R, 70R and reaches DC power supply PW. This prevents or reduces failures of circuit elements in energization system 72 such as switching elements $72U^+$, $72U^-$, $72V^+$, $72V^-$, $72W^+$, $72W^-$ in drive circuit 72INV and electrolytic capacitors 72Ca, 72Cb in the low-pass filter.

On the other hand, in energization system 71 and coil set 31, which are diagnosed as including an abnormality, an electric current flow through diode D of each lower-arm switching element $71V^-$, $71W^-$ and enters V-phase coil 31V and W-phase coil 31W of coil set 31. Then, the electric current flows through the neutral point N1 and then U-phase coil 31U. After that, the electric current flows through diode D of upper-arm switching element $71U^+$ and reaches semiconductor switch 71R. Here, semiconductor switch 71R is turned off by the fail-safe processing. However, the electric current caused by the counter electromotive force flows through parasitic diode $D_1$ of semiconductor switch 71R and then semiconductor switch 70R, which is turned on, and reaches DC power supply PW. This prevents or reduces failures of circuit elements in energization system 71, which is diagnosed as including an abnormality, such as switching elements $71U^+$, $71U^-$, $71V^+$, $71V^-$, $71W^+$, $71W^-$ in drive circuit 71INV and electrolytic capacitors 71Ca, 71Cb in the low-pass filter.

Considering that the forward direction of parasitic diode $D_0$ of semiconductor switch 70R is from DC power supply PW to semiconductor switches 71R, 72R, it may be conceivable that, even when semiconductor switch 70R is turned off, parasitic diode $D_0$ permits an electric current to flow therethrough from the DC power supply PW to energization systems 71, 72. However, semiconductor switch 70R is turned off when there is no potential need for generating the steering assist force by using the torque generated by motor 3, or when it is impossible to operate controller 70CU, for example. Thus, when semiconductor switch 70R is turned off, semiconductor switches 71R, 72R are also turned off. Therefore, an electric current rarely flows through parasitic diode $D_0$ from the DC power supply PW to energization systems 71, 72.

As described above, motor driving device 7 according to the first embodiment includes semiconductor switches 71R, 72R which are disposed in the energization systems in a one-to-one correspondence, and single semiconductor switch 70R which connects each of semiconductor switches 71R, 72R and DC power supply PW in series such that these three semiconductor switches 70R, 71R, 72R serve as the power supply relays for cutting off power supply from DC power supply PW to energization systems 71 and/or 72. Specifically, among these three semiconductor switches 70R, 71R, 72R, parasitic diodes $D_1$, $D_2$ of semiconductor switches 71R, 72R conduct currents from drive circuits 71INV, 72INV to semiconductor switch 70R, respectively, whereas parasitic diode $D_0$ of semiconductor switch 70R conducts a current from DC power supply PW to semiconductor switches 71R, 72R. This configuration not only allows prevention of closed circuit formation due to the reverse connection of DC power supply PW, but also simplifies the fail-safe processing. Specifically, after the fail-safe processing is performed to turn off the semiconductor switch in one of the energization systems that includes an abnormality, counter electromotive force can be regeneratively absorbed without extra control on the semiconductor switch in this abnormal energization system. In addition, this configuration does not require two semiconductor switches in each energization system, thus allowing reduction of the number of components in the power supply relays and thus reduction of the required cost and footprint.

Next, referring to FIGS. 5 to 7, three modifications of the first embodiment (first to third modifications) will be described. Each of the first to third modifications uses a low-pass filter having a configuration modified from that of the first embodiment.

As described above, in the first embodiment, the π-type low pass filter including coil 71L and two electrolytic capacitors 71Ca, 71Cb is disposed between drive circuit 71INV and semiconductor switch 71R in energization system 71, and the π-type low pass filter including coil 72L and two electrolytic capacitors 72Ca, 72Cb is disposed between drive circuit 72INV and semiconductor switch 72R in energization system 72. In the first to third modifications, low-pass filters having the configurations described below are used in place of the two π-type low pass filters individually provided in the energization systems.

Figure 5:
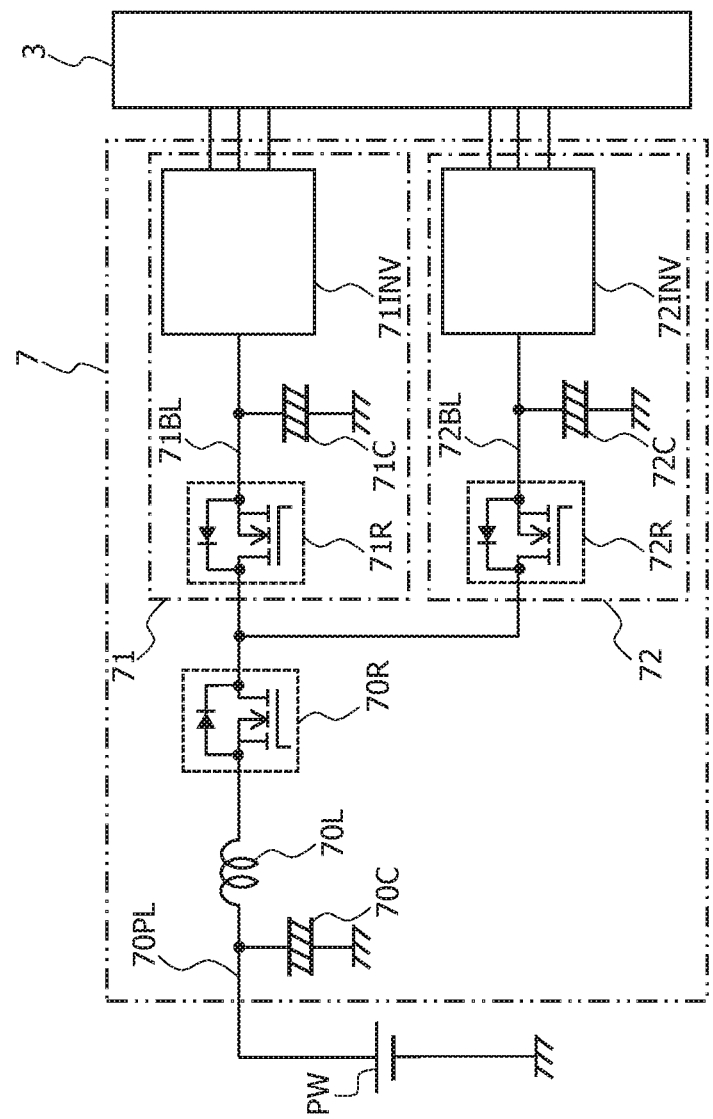
FIG. 5 is a circuit block diagram illustrating the internal configuration of the motor driving device according to a first modification.

In the first modification as illustrated in FIG. 5, power supply line 70PL is provided with (extends through) a CL-type low-pass filter including a coil 70L and an electrolytic capacitor 70C which connects the end, closer to DC power supply PW, of coil 70L to ground. Specifically, the CL-type low-pass filter is disposed between DC power supply PW and semiconductor switch 70R, for example. Power feed line 71BL is provided with (extending through) an electrolytic capacitor 71C which connects power feed line 71BL to ground. Specifically, electrolytic capacitor 71C is disposed between semiconductor switch 71R and drive circuit 71INV in energization system 71, for example. Power feed line 72BL is provided with (extending through) an electrolytic capacitor 72C which connects power feed line 72BL to ground. Specifically, electrolytic capacitor 72C is disposed between semiconductor switch 72R and drive circuit 72INV in energization system 72, for example. This allows reduction of the number of components in the low-pass filters in addition to reduction of the number of components in the power supply relays.

Figure 6:
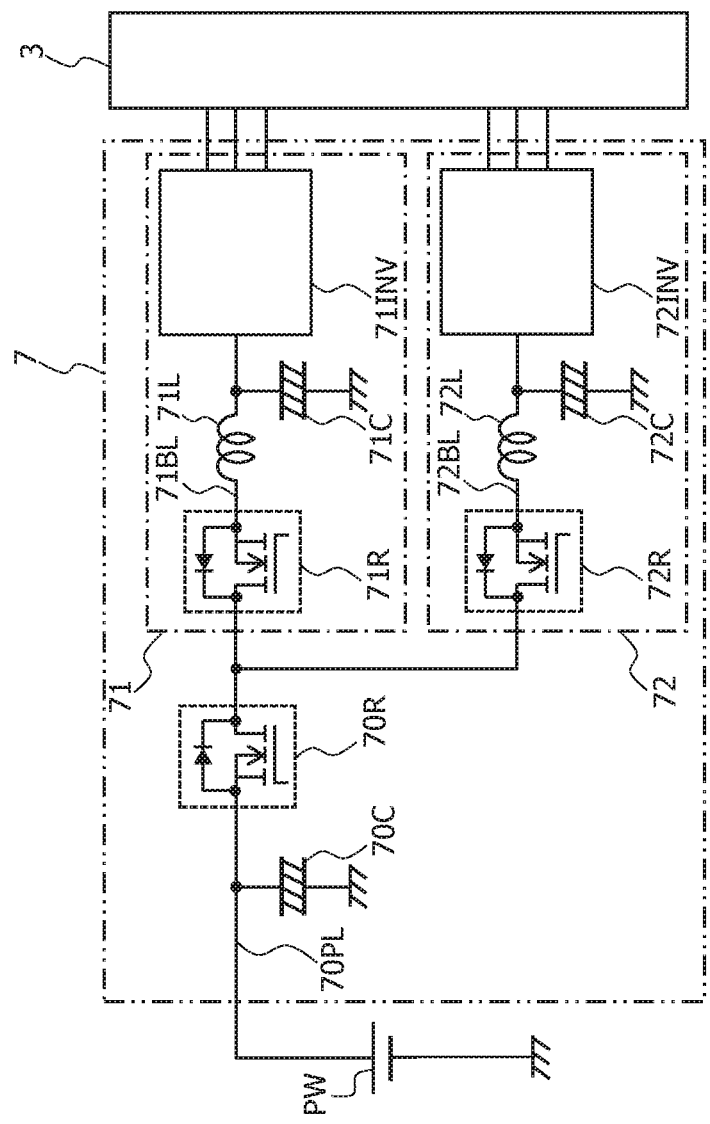
FIG. 6 is a circuit block diagram illustrating the internal configuration of the motor driving device according to a second modification.

In the second modification as illustrated in FIG. 6, power supply line 70PL is provided with (extends through) electrolytic capacitor 70C which connects power supply line 70PL to ground. Specifically, electrolytic capacitor 70C is disposed between DC power supply PW and semiconductor switch 70R, for example. Power feed line 71BL is provided with (extends through) an LC-type low-pass filter including coil 71L and electrolytic capacitor 71C which connects the end, closer to drive circuit 71INV, of coil 71L to ground. Specifically, the LC-type low-pass filter is disposed between semiconductor switch 71R and drive circuit 71INV in energization system 71, for example. Power feed line 72BL is provided with (extends through) an LC-type low-pass filter including coil 72L and electrolytic capacitor 72C which connects the end, closer to drive circuit 72INV, of coil 72L to ground. Specifically, the LC-type low-pass filter is disposed between semiconductor switch 72R and drive circuit 72INV in energization system 72, for example. This allows reduction of the number of components in the low-pass filters in addition to reduction of the number of components in the power supply relays.

Figure 7:
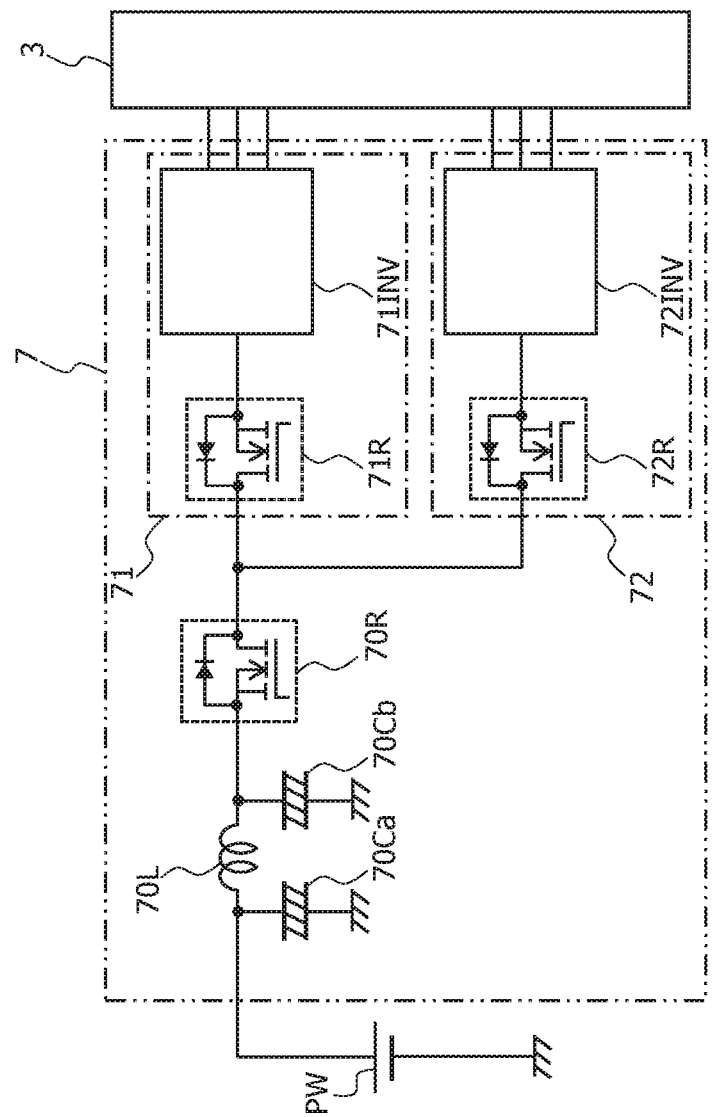
FIG. 7 is a circuit block diagram illustrating the internal configuration of the motor driving device according to a third modification.

In the third modification as illustrated in FIG. 7, power supply line 70PL is provided with (extends through) a π-type low pass filter including coil 70L and two electrolytic capacitors 70Ca, 70Cb. Specifically, the π-type low pass filter is disposed between DC power supply PW and semiconductor switch 70R. This allows reduction of the number of components in the low-pass filters in addition to reduction of the number of components in the power supply relays.

Figure 8:
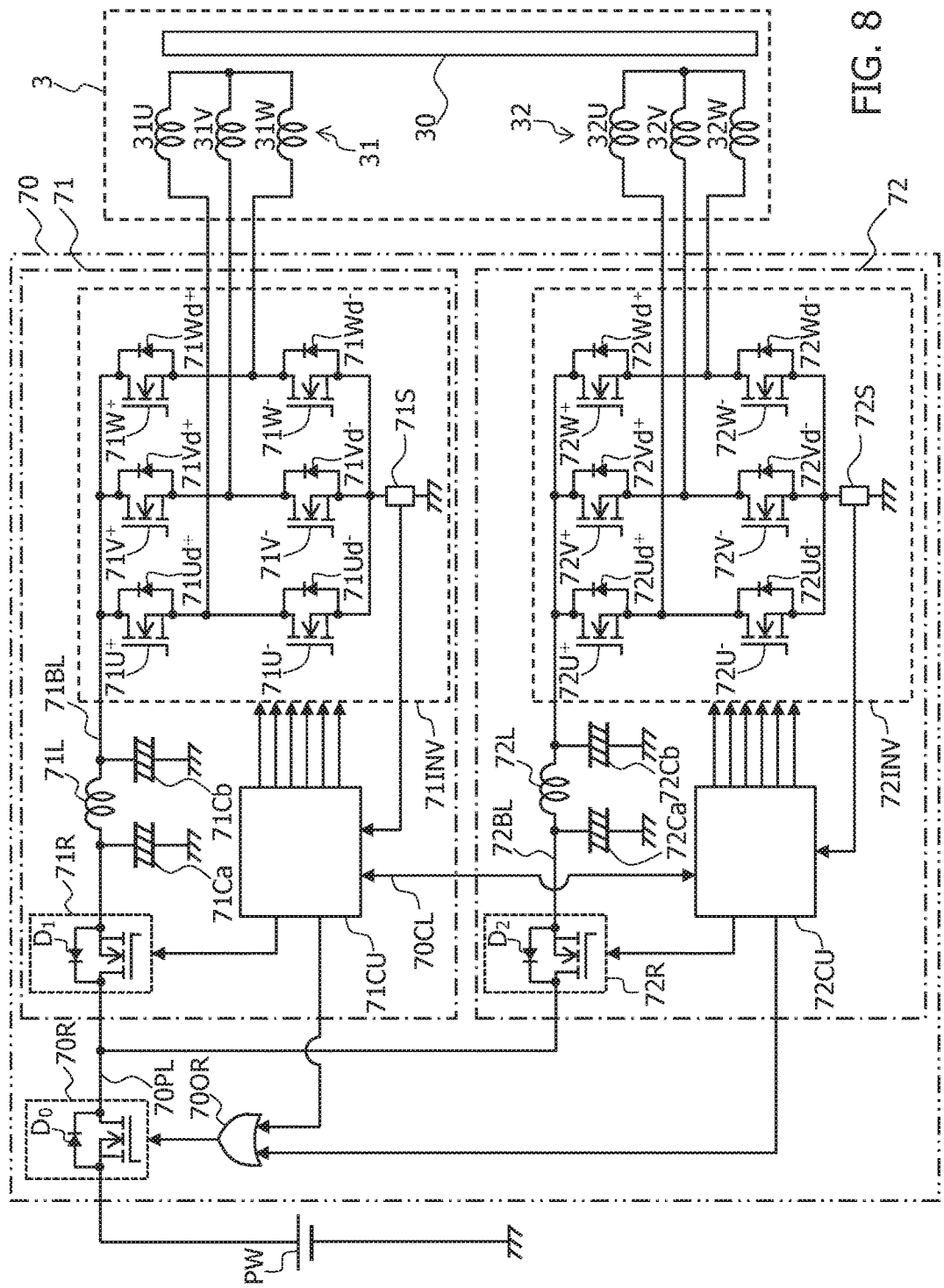
FIG. 8 is a circuit block diagram of the motor driving device according to a second embodiment of the present invention.

Next, referring to FIG. 8, a motor driving device according to a second embodiment will be described. The same reference numerals are given to the same components as those in the first embodiment, and the description thereof will be omitted or simplified.

Motor driving device 70 according to the second embodiment includes controllers (separate controllers) individually for the energization systems in place of controller 70CU of motor driving device 7 according to the first embodiment. Specifically, motor driving device 70 according to the second embodiment includes a controller (first separate controller) 71CU in energization system 71, and a controller (first separate controller) 72CU in energization system 72. The function of controller 70CU is divided into two each for one energization system, and these two functions are provided individually to controllers 71CU, 72CU in order to enhance the fail-safe function of motor driving device 70.

Controller 71CU calculates the first target output current and first actual current. Then, based on the difference between the first target output current and the first actual current, controller 71CU generates the six control signals for individually turning on and off six switching elements 71U$^+$, 71U$^-$, 71V$^+$, 71V$^-$, 71W$^+$, 71W$^-$ of drive circuit 71INV. Controller 71CU outputs these six control signals individually to the control terminals of the switching elements, thereby controlling the torque of motor 3. Controller 72CU calculates the second target output current and second actual current. Then, based on the difference between the second target output current and the second actual current, controller 72CU generates the six control signals for individually turning on and off six switching elements 72U$^+$, 72U$^-$, 72V$^+$, 72V$^-$, 72W$^+$, 72W$^-$ of drive circuit 72INV. Controller 72CU outputs these six control signals individually to the control terminals of the switching elements, thereby controlling the torque of motor 3.

Note that at least one of controllers 71CU, 72CU may calculate the target steering assist force and the target total output current necessary for calculating the first and second target output currents. When any one of controllers 71CU, 72CU calculates the target steering assist force and target total output current, the one controller may output, to the other controller, a signal including information on the resultant target total output current via a communication line 70CL connecting controllers 71CU, 72CU with each other.

Controller 71CU has an abnormality diagnostic function for diagnosing whether or not an abnormality has occurred in energization system 71 and coil set 31. Controller 72CU has an abnormality diagnostic function for diagnosing whether or not an abnormality has occurred in energization system 72 and coil set 32.

For example, when controller 71CU diagnoses that an abnormality has occurred in energization system 71 and coil set 31, controller 71CU outputs an abnormality occurrence signal through communication line 70CL to controller 72CU in energization system 72, which is operating normally. Controller 71CU performs the fail-safe processing to output the control signals for turning off semiconductor switch 71R as well as switching elements 71U$^+$, 71U$^-$, 71V$^+$, 71V$^-$, 71W$^+$, 71W$^-$ of drive circuit 71INV, thereby cutting off power supply to drive circuit 71INV and coil set 31. Meanwhile, controller 72CU resets the output current ratio of drive circuit 72INV to the predetermined value of 50 to 100% and maintains semiconductor switch 72R turned on. Thereby, controller 72CU continues and increases power supply to energization system 72, thus controlling the torque of motor 3 so as to cause motor 3 to generate a torque corresponding to the target steering assist force.

In addition, motor driving device 70 includes a logic OR circuit 70OR. When a potential need for generating the steering assist force by using the torque generated by motor 3 arises, such as when the ignition key of vehicle 1 is turned on, each controller 71CU, 72CU outputs, to OR circuit 70OR, a status signal indicating whether the corresponding energization system and coil set are operating normally or abnormally. In response, OR circuit 70OR outputs an output signal (logical output) of the logical sum to the control terminal of semiconductor switch 70R. When both the status signals indicate abnormal operation, the output signal of the logical sum acts as a control signal for turning off semiconductor switch 70R. When not both the status signals indicate abnormal operation, the output signal acts as a control signal for turning on semiconductor switch 70R. When there is no potential need for generating the steering assist force by using the torque generated by motor 3, neither controller 71CU nor 72CU outputs the status signal to OR circuit 70OR and semiconductor switch 70R is turned off.

The first to third modifications of the first embodiment may be applied also to motor driving device 70 according to the second embodiment.

In motor driving device 70 according to the second embodiment, separate controllers 71CU, 72CU are provided respectively to energization systems 71, 72, and the function that may be performed by a single controller is divided into two each for one energization system, and these two functions are provided individually to controllers 71CU, 72CU in order to enhance the fail-safe function of motor driving device 70. Like the first embodiment, this configuration not only allows semiconductor switches 70R, 71R, 72R to prevent closed circuit formation due to the reverse connection of DC power supply PW, but also simplifies the fail-safe processing for one of the energization systems that includes an abnormality. Specifically, a counter electromotive force can be regeneratively absorbed without extra control on the semiconductor switch in this abnormal energization system. In addition, this configuration does not require two semiconductor switches in each energization system, thus allowing reduction of the number of components in the power supply relays and thus reduction of the required cost and footprint.

The invention made by the present inventor has been specifically described above based on the first and second embodiments. Obviously, however, the present invention is not limited to the above embodiments, and various alterations may be made within the scope of the spirit of the present invention. For example, motor 3 is not limited to a three-phase brushless motor, and may be a different brushless motor such as two-phase or four-phase brushless motor, or may even be a brushed motor.

In the first and second embodiments, during a normal state, i.e., when energization systems 71, 72 and the like are diagnosed as operating normally, motor 3 generates a torque corresponding to the target steering assist force by using the total output current obtained by adding the output currents of both driving circuits 71INV, 72INV together. Alternatively, during a normal state, motor 3 may generate a torque corresponding to the target steering assist force by using the output current of any one of driving circuits 71INV, 72INV. For example, in an initial phase, semiconductor switches 70R, 72R may be turned on and semiconductor switch 71R may be turned off such that motor 3 may generate a torque corresponding to the target steering assist force by using the output current of drive circuit 72INV in energization system 72. In such a setting, when rotor 30 of motor 3 rotates relative to coil set 31 and generates a counter electromotive force, an electric current flows through energization system 71, which is currently not operating. However, such an electric current flows through diode $D_1$ of semiconductor switch 71R and then through semiconductor switch 70R, which is turned on, toward DC power supply PW. Accordingly, failures of circuit elements in energization system 71, which is currently not operating, is prevented or reduced even in such a setting. When it is diagnosed that an abnormality has occurred in energization system 72 and coil set 32, semiconductor switch 72R may be turned off and semiconductor switch 71R may be turned on instead.

In the first and second embodiments, each semiconductor switch 70R, 71R, 72R is a semiconductor element, such as a MOSFET, having a parasitic diode that is inevitably formed in the manufacturing process. However, the present invention is not limited to this. Each semiconductor switch 70R, 71R, 72R may be a semiconductor element that does not have a parasitic diode, and connected antiparallel to an external diode.

In the first and second embodiments, motor 3 has two coil sets 31, 32, and motor driving device 7, 70 correspondingly has two energization systems 71, 72. However, this is merely for convenience of explanation, and motor 3 may have N coil sets, and motor driving device 7, 70 may correspondingly have N energization systems, where N is greater than 2. In such a case, first semiconductor switches are disposed on the respective power feed lines to the drive circuits in N energization systems in the same manner as for semiconductor switches 71R, 72R, and a second semiconductor switch is disposed so as to connect each of N semiconductor switches and DC power supply PW in series in the same manner as for semiconductor switch 70R, which connects each of semiconductor switches 71R, 72R and DC power supply PW in series. In addition, the forward directions of their parasitic diodes are oriented as in the first and second embodiments.

When motor 3 has N coil sets, and motor driving device 7, 70 correspondingly has N energization systems, where N is greater than 2 in the first and second embodiments, the total output current ratio of the drive circuits may be reset as follows. When M energization systems and the like are diagnosed as including an abnormality, where M is greater than 1, the total output current ratio of the drive circuits in (N−M) energization systems and the like that are diagnosed as operating normally may be reset to a predetermined value of [100×(N−M)/N] % to 100%. The output current ratio of each drive circuit may be reset to (100/N) % to [100/(N−M)] %.

REFERENCE SYMBOL LIST

1 vehicle
2 electric power steering system
3 motor
31, 32 coil set
7, 70 motor driving device
70CU, 71CU, 72CU controller
70R semiconductor switch
71, 72 energization system
71INV, 72INV drive circuit
71R, 72R semiconductor switch
$D_0$, $D_1$, $D_2$ parasitic diode

The invention claimed is:

1. A motor driving device for driving a motor having a plurality of coil sets, comprising:
    a plurality of energization systems each including a drive circuit, the plurality of drive circuits being one-to-one connected to the plurality of coil sets;
    a plurality of first semiconductor switches disposed in the plurality of energization systems in a one-to-one correspondence, each first semiconductor switch lying between a power supply and a corresponding one of the plurality of drive circuits;
    a second semiconductor switch which connects the power supply and each of the plurality of first semiconductor switches in series; and
    a controller connected to the plurality of drive circuits and the first and second semiconductor switches so as to control the plurality of drive circuits and the first and second semiconductor switches, wherein
    each of the plurality of first semiconductor switches includes a parasitic diode of which a forward direction is from a corresponding one of the drive circuits to the second semiconductor switch, and the second semiconductor switch includes a parasitic diode of which a forward direction is from the power supply to the first semiconductor switches.

2. The motor driving device according to claim 1, wherein the controller diagnoses whether or not an abnormality has occurred in the plurality of energization systems, and when the controller diagnoses that an abnormality has occurred in any of the plurality of energization systems, the controller turns off, among the first semiconductor switches, a first semiconductor switch in the energization system in which the abnormality has occurred.

3. The motor driving device according to claim 1, wherein the controller turns on the second semiconductor switch when driving the motor.

4. The motor driving device according to claim 1, wherein the controller includes separate controllers in the energization systems in a one-to-one correspondence, each of the separate controllers diagnoses whether or not an abnormality has occurred in a corresponding one of the energization systems, and when any of the separate controllers diagnoses that an abnormality has occurred in a corresponding one of the energization systems, the separate controller turns off the first semiconductor switch in the energization system.

5. The motor driving device according to claim 4, wherein each of the separate controllers outputs a status signal indicating whether a corresponding one of the energization systems is operating normally or abnormally, and the second semiconductor switch is connected to the separate controllers so as to be controlled based on the status signals.

6. The motor driving device according to claim 5, further comprising a logic circuit connected to the separate controllers so as to receive the status signals, wherein the second semiconductor switch is connected to the logic circuit so as to be controlled based on a logical output from the logic circuit.

7. The motor driving device according to claim 1, further comprising:

a power supply line extending from the power supply through the second semiconductor switch; and a plurality of power feed lines branched from the power supply line, each of the plurality of power feed lines extending to a corresponding one of the plurality of energization systems through a corresponding one of the first semiconductor switches, wherein the power supply line extends through a CL-type low-pass filter, and each of the plurality of power feed lines extends through a capacitor connected to ground.

8. The motor driving device according to claim 1, further comprising:

a power supply line extending from the power supply through the second semiconductor switch; and a plurality of power feed lines branched from the power supply line, each of the plurality of power feed lines extending to a corresponding one of the plurality of energization systems through a corresponding one of the first semiconductor switches, wherein the power supply line extends through a capacitor connected to ground, and each of the plurality of power feed lines extends through an LC-type low-pass filter.

9. The motor driving device according to claim 1, further comprising:

a power supply line extending from the power supply through the second semiconductor switch; and a plurality of power feed lines branched from the power supply line, each of the plurality of power feed lines extending to a corresponding one of the plurality of energization systems through a corresponding one of the first semiconductor switches, wherein the power supply line extends through a π-type low pass filter.

10. The motor driving device according to claim 1, wherein the motor is used to generate a torque corresponding to a steering assist force of an electric power steering system.

* * * * *